Jan. 31, 1928.
W. T. LIVERMORE
1,657,541
BRAKE MECHANISM
Filed June 23, 1924
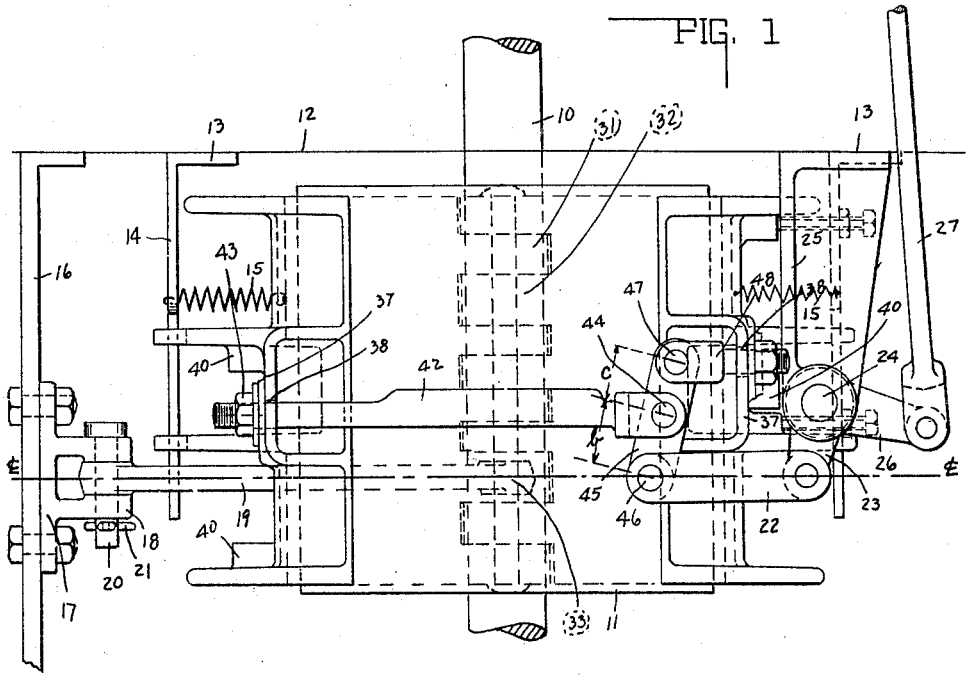
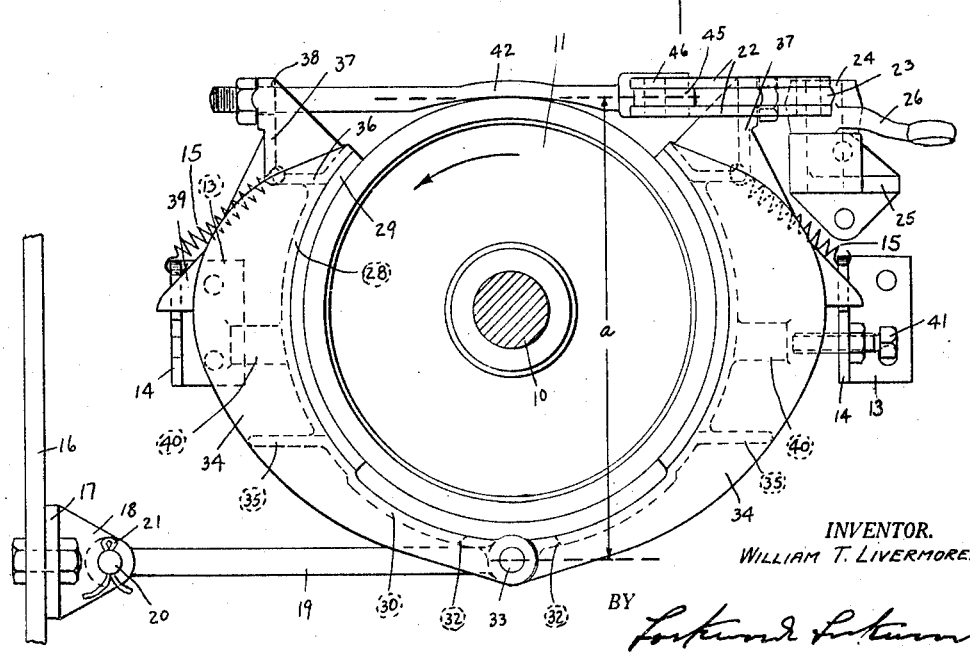
INVENTOR.
WILLIAM T. LIVERMORE.
BY
ATTORNEYS.

Patented Jan. 31, 1928.

1,657,541

UNITED STATES PATENT OFFICE.

WILLIAM T. LIVERMORE, OF ALLENTOWN, PENNSYLVANIA, ASSIGNOR TO GRAHAM BROTHERS, OF EVANSVILLE, INDIANA, A CORPORATION.

BRAKE MECHANISM.

Application filed June 23, 1924. Serial No. 721,779.

This invention relates to a brake construction, and herein is illustrated as of the contracting type.

One object of the invention is to construct a brake construction in a floating arrangement which is designed for the purpose of eliminating the necessity for accurately machining parts.

Another object of the invention includes the idea of so proportioning any type of braking surface that the force required to operate it will be of the proper amount and in the proper direction to produce the desired result.

The full nature of the invention will be understood from the accompanying drawings and the following description and claims.

In the drawings, Fig. 1 is a top plan view of a power shaft supporting a brake drum with which is associated a contracting frictional gripping drum-engaging surface in the form of shoes. Fig. 2 is a side elevational view thereof.

In the drawings 10 indicates a power shaft carrying a brake drum 11 suitably secured thereto and driven thereby. A support 12 suitably supports a pair of identical brackets 13. These are suitably secured to the support 12 by the base portion and have an outwardly projecting portion 14. Another bracket 16 supports a pivotal bearing forming bracket 17, which has a pair of bearing ears 18 that pivotally support a link 19 by means of the pin 20 suitably secured by the cotter pin 21. This link 19 forms the floating support for the brake construction and the pivot described takes the force due to the friction of the brake. In the same plane as shown by the dotted center lines in Fig. 1 with this link, is another link 22, one end of which is connected to one arm 23 of a bell crank pivotally supported at 24 in a bracket 25. The other arm 26 of the bell crank is connected to a rod 27 by which force is applied to the brake construction. The link 22 also takes the force due to the friction of the brake, as well as transmits the force applied through the rod 27 for braking purposes.

Herein there is illustrated a brake drum-engaging surface which is of the contracting and shoe type. Each shoe is identical to the other, and, therefore, a description of one will suffice. Herein the shoe is shown provided with a curved surface 28 adapted to support a brake lining 29 which is adapted to engage the brake drum 11 and restrain the movement of the shaft 10. Herein the drum-engaging surface of the shoe 28 is shown extended at 30, and the end thereof terminates in a plurality of stepped pivot bearings 31. Likewise, there is provided a pair of notches 32 which provide clearance for the head of the rod or link 19, whereby said link supports a hinge or pivot pin 33. The foregoing arrangement, it will be noted, see Fig. 1, is secured by the particular formation of the two identical shoes so that they are complementary in forming a pivotally hinged construction provided with a slot 32 for the reception of the support.

The shoe in addition to the foregoing is provided with a plurality of reenforcing flanges or vanes, and herein the same are indicated by the numeral 34. A transverse flange is indicated by the numeral 35 and another parallel thereto is indicated by the numeral 36. Said flange 36 extends upwardly at 37 and is provided with a bearing opening 38 suitably offset from the center of said extension. One or more of the vanes 34 is provided with a toothed portion or lug 39, which tooth or lug is normally seatable on the bracket 14 when the brakes are released. Herein two of said vanes are shown provided with said lugs. These lugs by cooperating with the bracket 14 provide a support for the weight of the two shoes when released. The lugs 40 are also provided and the bracket 14 is adapted to adjustably support a pair of set screws 41 which limit the releasing movement of the shoes, by contacting the flanges 34. A spring 15 between the shoe and adjacent bracket 14 assists in releasing the brake and maintaining the same released.

In one of the openings 38 of the upper extension 37 on the shoe is supported a link 42, which link is adjustably supported therein by the nut 43. The other end of the link is pivotally supported at 44 by a link 45 that has one end pivotally supported at 46 to the other end of the link 22. The distance between the centers 44 and 46 is indicated by the dimension $b$ in Fig. 1. The other end of the link 45 is pivotally supported at 47 by a bolt 48 also adjustably receivable by the other opening 38 in the other bracket extension 37. The distance between the pivotal centers 44 and 47 is indicated by the dimension c. Also see Fig. 2, the distance between the center line or plane of the linkage and the plane of the support for the brake is indicated by the dimension a in Fig. 2. The distances b and c are calculated with reference to distance a, braking torque link tension and braking pressure to obtain the result that the pressure between the brake drum and the left shoe is equal to the pressure between the brake drum and the right shoe.

Force applied to the end of link 27 rocks bell crank 26—23 on pivot 24. Arcuate movement of arm 23 is carried linearly or tangentially thru link 22 to lever 45. The pull on link 22 applies left hand shoe 28, that is, moves the same into position but does not exert clamping force thereon. Up to this time continued pull on the link 22 is exerted to draw the right hand shoe into drum position. Both shoes thereupon are coaxially arranged with respect to the drum and the remainder of the pull is applied to clamp the coaxially arranged shoes to the drum for braking. The floating anchorage permits such coaxial movement and also prevents rotation of the braking surface during the braking action. It will be apparent, therefore, by reason of the coaxial movement of the braking surface that the forces applied to each of the shoes are equal. Pull on the end of each brake shoe multiplied by the distance from the plane of link 42 to pivot 33 is the moment equal to the friction moment of the shoe.

The foregoing construction provides that there will be no radial load on the shaft which supports the drum when braking action is secured. Likewise, there will be equal wear on the brake linings of both shoes. It will also be noted that no accurate location of any of the supporting parts is necessary. It will be noted that the foregoing is due to the full floating suspension, the shoes being free to be positioned concentrically with the drum as a result of the clamping action.

While the invention has been described in great detail in the foregoing specifications, the same is not to be limited thereby, for said description is considered to be illustrative and not restrictive in character.

The invention claimed is:

1. In a brake construction, the combination of a drum-engaging surface, a link connected to one end of said drum-engaging surface, another link pivotally supported at the other end of said drum-engaging surface and pivotally supporting said first-mentioned link, a link connected at one end to the second-mentioned link for properly directing the force applied thereto, and a bell crank connected to the other end of said third-mentioned link for actuating the drum-engaging surface by applying through the third-mentioned link a force of substantially correct amount to balance the frictional moment of the brake.

2. In a brake construction, a rotatable drum, the combination with the ends of a braking surface for said drum, of a link pivotally connected at one end to one of said surface ends, a link connected at one end to the other surface end, means for applying a clamping force to the free end of said second mentioned link, the first and second mentioned links pivotally connected to each other at a point between the connection of the second mentioned link with its braking surface and said clamping force, and a floating support for said braking surface substantially intermediate the ends thereof.

3. In a brake construction, a rotatable drum, the combination with the ends of a braking surface for said drum, of link mechanism connecting the ends of said braking surface, a pressure link operating to apply braking pressure to said link mechanism and a pivotal floating support for the intermediate portion of said braking surface and disposed in the same vertical plane with said pressure link.

In witness whereof, I have hereunto affixed my signature.

WILLIAM T. LIVERMORE.